Patented July 22, 1941

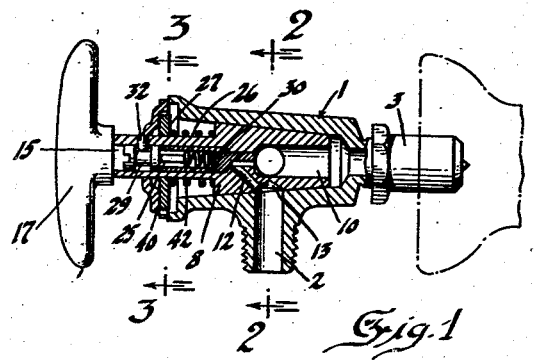

2,249,982

UNITED STATES PATENT OFFICE 2,249,982

VALVE

Francis H. Rutherford and Ernest B. Whitmarsh, Detroit, Mich., assignors to Detroit Brass & Malleable Works, Detroit, Mich., a corporation of Michigan Application July 12, 1940, Serial No. 345,108

4 Claims. (Cl. 277—53)

This invention relates to a valve which is especially useful as a gas cock for a gas range.

The principal object of the invention is to provide an improved gas cock capable of supplying a large gas volume for a large flame and a small gas volume for a small or simmer flame and wherein an adjustable controlling means is accessible and operable through the stem of the valve and on the valve axis for governing the low volume of gas and resultant size of the low or simmer flame. The improved construction facilitates assembly and provides a controlling member or valve which cannot be removed or tampered with after it is placed in the hands of the user. Another object is to provide a controlling valve in the nature of a tapered plug valve to thus form and insure a tight joint or seal to prevent gas leakage, and this tapered plug or controlling valve is held on its seat yieldingly as by means of a spring. This structure facilitates easy turning of the controlling valve member for regulation purposes, and eliminates any binding tendency, whether the valve operates at high or low temperatures. The controlling valve is arranged to provide a port or passage in which the tendency to clog or fill with tars or sediment is minimized and wherein it is not necessary to supply a lubricant to provide the gas seal.

In the drawing:

Fig. 1 is a vertical longitudinal section of an assembled valve taken on line 1—1 of Fig. 3.

Fig. 2 is a section on line 2—2 of Fig. 1.

Fig. 3 is a section on line 3—3 of Fig. 1.

Fig. 4 is a perspective view of the cap.

Fig. 5 is a sectional view of the valve in off position.

Fig. 6 is a sectional view showing the valve in simmer on position.

Fig. 7 is a sectional view showing the valve in full "on" position.

Fig. 8 is a view of the valve plug and parts which are assembled within it.

Fig. 9 is a sectional view of a modified form of the valve.

Fig. 10 is a section on line 10—10 of Fig. 9.

The valve comprises a body 1 with a tapered hollow interior forming a tapered seat, and it has an inlet 2 for connection to a usual manifold or gas supply pipe and an outlet 3. The valve body may be provided with wings or extensions 4 for the reception of a cap 5.

The tapered plug is illustrated at 8 and it has a lateral bore or passageway 9 which leads into an axial bore 10 which communicates with the outlet, the port 9 being arranged to be registered with or shifted out of registry with the inlet 2. The plug also has a passageway 12 which communicates with the periphery of the plug valve preferably through a recess 13 to aid in preventing the small passage 12 from clogging, while the other end communicates into an axial passage 14.

The stem 15 is hollow and communicates with the passage 14, and the end of the stem may be slabbed off as at 16 so that it has a D formation for the reception of a handle 17. At the intersection of the hollow cavity in the stem and the chamber 14 is a tapered seat 20.

It will be understood how the valve can be turned so that when the port 9 aligns with the inlet 2 there is a full flow of gas for a full flame, and how, when the recess 13 is aligned with the inlet, the smaller supply of gas flows through the passage 12 into the bore 14 and then out through the outlet 3 for a smaller or simmer flame. This smaller or simmer flame is controllable by the controlling of the volume of gas passing through the by-pass or passage 12.

To this end, a control and sealing member 21 is placed into the hollow stem and it has a projecting end 22 of eccentric or D shape, as shown, and this fits into the chamber 14, leaving, however, a passage on the flat side of the D. The member 21 also has a tapered formation 23 designed to seat in the tapered seat 20 to seal against leakage of gas. The member 21 is hollow as illustrated, has opposite slots 25 for the reception of a key 26 of a screw and reaction member 60 which has two heads 27 and 28 forming a groove 29 therebetween. The outer head of the screw and reaction member is adapted to receive a turning tool such as a screw driver. A spring 30 positioned in the hollow member 21 reacts against the bottom of the cavity and the key 26. These parts are held in assembly with the spring 30 under compression by means of a pin 32 having a driving fit in an aperture 33 and which lies in the groove 29. The spring 30 urges the head 27 against the pin and causes the tapered part 23 to seat on the tapered seat 20.

It will readily be seen that by turning the head 28 the key 26 causes the turning of the member 21, thus shifting the D-shaped extension 22 relative to the passage 12. In other words, the passage 12 may be completely open or partially closed by one edge or the other at the intersection of the curved and flat faces of the D 22. The turning torque is low as there is only a slight friction to be overcome, the tapered seal at the parts 20 and 23 is efficient and effective, requiring no lubricant to effect the seal, the method of assembly is easy, and once assembled the parts cannot be removed or tampered with. The handle 17 may be slipped "on" and "off," and to make an adjustment it is merely removed and a suitable tool inserted to turn the head 28.

The valve may also include means for aiding in indicating to the operator the position of the respective parts. To this end, a washer 40 with a projection 41 is loosely mounted on the D shaped stem 16 so that it has some relative rotation. This washer underlies the cap, and a spring 42 is positioned between the washer and the plug valve. The spring thus holds the plug valve on its seat and the washer reacts against the cap, with the projection 41 frictionally wiping along the surfaces of the cap as the valve is turned. This cap may be a stamping, and it is provided with a stop 45 and a stop 46 against which the projection abuts to limit the movements of the valve member. Between these two stops, means is provided for indicating an intermediate position, and this may take the form of a recess 47 defined by inclined abutments 48 and 49, which are surmountable by the projection 41. When the projection is against the stop 45, the valve is completely "off," as shown in Fig. 5. When the valve is turned clockwise as the figures are viewed, the projection, upon moving over the upper edge of the inclined abutment 48, shifts down the incline with a snapping action caused by the action of the spring 42 and the looseness of the washer 40 on the stem. This creates an audible sound and indicates that the valve is in simmer "on" position as shown in Fig. 6. Further clockwise movement causes the projection 41 to ride up the incline 49 and ultimately abut the stop 46, and now the valve is in full "on" position, as shown in Fig. 7. With the arrangement shown there is a snapping action as the valve is turned counter-clockwise when the projection 41 snaps over the inclined abutment 49. The abutments 48 and 49 are so arranged that the projection may be caused to ride up and over them without an undue application of turning torque. So far as the stem adjustment is concerned for the simmer, this controlling feature of the washer and its stop may be varied.

Illustrated in Figs. 9 and 10 is a modified form of the valve adapted to operate where separate burners or separate burner sections are provided for the large flame and for the simmer flame. The provision of an additional outlet and different gas passages in the valve comprise the main differences of this form from that hereinbefore described.

An outlet 50 adapted to connect with the simmer burner or simmer burner section is provided on the valve body in addition to the inlet 2 and outlet 3 already described. A passage 51 in the valve body communicates with the inlet 2 and the hollow interior of the valve body. The tapered valve plug is provided with an axial passage 52 and a lateral port 53 which, together, are adapted to connect the inlet 2 with the outlet 3. The tapered valve plug is also provided with two surface grooves 54 and 55 which substantially, but not completely, circumscribe the valve body. Sufficient surface areas 56 and 57 must be left between these grooves to seal passage 51 and outlet passage 50 when the valve member is rotated. The grooves should be long enough to maintain a passage for gas for the simmer burner during a relatively large rotation of the valve member. Thus during the rotation of the valve member the passage for simmer gas is opened and remains open before, during and after the opening of the main burner gas supply passage. A small lateral passage 58 is provided in the valve plug to connect grooves 54 and 55. An axial cylindrical passage 59 intersects passage 58. Axial passage 59 corresponds to the cylindrical part 14 of the form previously described and is adapted to permit rotation of the D-shaped projection on the stem adjustment thereby to control flow of gas in passage 58. Groove 54 is adapted to communicate with passage 51. Groove 55 is adapted to communicate with the outlet 50. It will readily be seen, therefore, that a separate passage to the simmer burner or simmer burner section is provided by inlet 2, passage 51, groove 54, passage 58, groove 55 and outlet 50. The stem adjustment regulates the flow of simmer gas supply in the manner previously described.

The valve structure can be used with a variety of arrangements relative to the "off," "on" and "simmer" positions. As shown in Fig. 1 the simmer is the intermediate position, and the valve can be turned from "off" position to "on" position and then back to simmer. The cap and washer arrangement provides for an audible click at the intermediate or simmer position, but this may be either a click or an arresting action. The valve can also be used where the intermediate position is the full "on" position with either a click or an arresting action. As regards the valve shown in Fig. 9, the illustration is such that the simmer is open at the intermediate position and remains open when the valve is turned to full "on" position; but the full "on" through the main ports may be the intermediate position with the simmer coming on as the valve is turned to the limit of its movement, and a suitable clicking action or arresting action may be employed to indicate the intermediate position.

We claim:

1. A gas cock comprising, a valve body having an inlet and an outlet, a valve member turnable in the body and having a main passageway for connecting and disconnecting the inlet and outlet, and having a second passage for registry with the inlet, a stem of hollow formation on the valve member including a hollow axially extending part communicating with the outlet and with the second passage, a tapered seat in the hollow formation adjacent said part, an axial plug member in the stem and having a tapered portion fitting on said seat to provide a gas seal, said plug member having an eccentric portion positioned in said part, and the plug member being turnable to shift the eccentric part relative to the second passage for controlling a flow area of gas therethrough.

2. A gas cock comprising, a valve body having an inlet and an outlet, a valve member turnable in the valve body and having a main passageway for connecting and disconnecting the inlet and outlet, a stem of hollow formation on the valve member which includes a part on the axis of the valve member which communicates with the main passage in the valve, a second passage in the valve member registrable with the inlet and communicating into the side of said part of the hollow formation, a tapered seat at the juncture between said part and the remaining portion of the hollow formation, and a controlling valve member having a tapered portion seating on said seat and having an extending end of D formation positioned in said part, said controlling valve member being turnable to shift the D formation and vary the size of the gas passageway through the second inlet passage.

3. In a gas cock, a body having an inlet and an outlet, a turnable plug member in the body having two inlet passages and a common outlet passage for full and low gas supplies, a stem on the valve member, an axial passageway extending through the stem and communicating into the common outlet, said axial passageway having tapered seat intermediate its ends, one of the inlet passages communicating into the side of the said axial passageway between the tapered seat and the common outlet, a plug valve member positioned in the axial passageway and having a tapered formation fitting on the seat and having an eccentric extension for controlling said one inlet passage upon rotation of the plug member, a turning member keyed to the plug member, means securing the turning member to the stem for rotary movement thereof and to prevent axial movement thereof and a spring positioned between the plug type controlling member and said turning member.

4. A gas cock comprising a hollow valve body having inlet means and outlet means, a valve member turnable in the body and having a main passageway registrable with inlet means and outlet means and having a second passage for registry with inlet and outlet means, a stem of hollow formation on the valve member including a bore communicating with the said second passage, a tapered seat in the hollow formation at the end of the bore, a plug member in the stem and having a tapered portion fitting on said seat to provide a gas seal, said plug member having an eccentric end portion extending into said bore and the plug member being turnable to shift the eccentric part relative to the second passage for controlling a flow of gas therethrough.

FRANCIS H. RUTHERFORD.
ERNEST B. WHITMARSH.